United States Patent
Sampaio (10) Patent No.: US 8,893,392 B2
(45) Date of Patent: Nov. 25, 2014

(54) DOUBLE SIDED PEELER

(71) Applicant: Casabella Holdings, LLC, Congers, NY (US)

(72) Inventor: Andre Sampaio, Valley Cottage, NY (US)

(73) Assignee: Casabella Holdings, LLC, Congers, NY (US)

( * ) Notice: Subject to any disclaimer, the term of this patent is extended or adjusted under 35 U.S.C. 154(b) by 197 days.

(21) Appl. No.: 13/622,826

(22) Filed: Sep. 19, 2012

(65) Prior Publication Data

US 2014/0075759 A1 Mar. 20, 2014

(51) Int. Cl.
*A47J 17/02* (2006.01)

(52) U.S. Cl.
USPC .......................................... 30/279.2

(58) Field of Classification Search
CPC ............ A47J 17/02; A47J 17/04; A47J 17/08
USPC .................. 30/278–279.6, 123.5, 123.6, 152; D7/693–696
See application file for complete search history.

(56) References Cited

U.S. PATENT DOCUMENTS

| | | | |
|---|---|---|---|
| 751,567 A * | 2/1904 | Search | 30/279.6 |
| 928,134 A | 7/1909 | Konigstein | |
| 966,496 A * | 8/1910 | Wagner | 30/279.6 |
| 1,540,284 A * | 6/1925 | Reveny | 30/279.6 |
| 2,031,191 A * | 2/1936 | Swedeland | 30/279.6 |
| 2,054,480 A * | 9/1936 | Leitshuh | 30/279.2 |
| 2,228,572 A * | 1/1941 | Lofgren | 30/279.6 |
| 2,252,094 A * | 8/1941 | Palmer | 30/279.6 |
| D137,687 S | 4/1944 | Morris | |
| D148,771 S * | 2/1948 | Davis | D7/695 |
| 2,507,019 A | 5/1950 | Johnson | |
| 2,554,189 A * | 5/1951 | Hall | 30/123.5 |
| 2,611,178 A | 9/1952 | Whipple et al. | |
| 2,727,305 A * | 12/1955 | Meohas | 30/279.6 |
| 2,777,195 A * | 1/1957 | Dalianis | 30/279.2 |
| 3,009,245 A * | 11/1961 | Senkewitz | 30/123.6 |
| 3,220,110 A | 11/1965 | Popeil | |
| 3,406,450 A * | 10/1968 | Grotz | 30/279.6 |
| 3,621,899 A | 11/1971 | Hula | |
| 4,592,140 A * | 6/1986 | Chasen | 30/279.6 |
| 4,608,757 A * | 9/1986 | Eckerle | D8/98 |
| D290,804 S | 7/1987 | Chasen | |
| 4,893,408 A | 1/1990 | Mattingly et al. | |
| 5,093,994 A | 3/1992 | Karas | |

(Continued)

FOREIGN PATENT DOCUMENTS

DE 202011103365 U1 * 8/2011
DE 102010028178 A1 * 10/2011

*Primary Examiner* — Jason Daniel Prone
(74) *Attorney, Agent, or Firm* — Curtis, Mallet-Prevost, Colt & Mosle, LLP (57) ABSTRACT

A double sided peeler is disclosed. The double sided peeler has two peeler blades and a slide cover for protecting the user from the peeler blade that is not in use. Each peeler blade may have a different attribute to accommodate a wide range of fruits and vegetables. The double sided peeler has a spot tool and retainer for both removing unwanted spots from a fruit or vegetable and also for retaining the slide cover in a given position. A retention web on the slide cover cooperates with the spot tool and retainer to retain the slide cover in a given position that protects both the unused peeler blade and the user.

19 Claims, 6 Drawing Sheets

(56) References Cited

U.S. PATENT DOCUMENTS

| | | | |
|---|---|---|---|
| 5,237,749 A * | 8/1993 | Henning et al. | 30/123.6 |
| 5,865,110 A * | 2/1999 | Yonezawa | 30/279.6 |
| 5,960,544 A | 10/1999 | Beyers | |
| D420,867 S * | 2/2000 | Lion et al. | D7/695 |
| 6,085,423 A | 7/2000 | Marifone | |
| 6,148,522 A | 11/2000 | Dobandi | |
| D446,428 S | 8/2001 | Stewart et al. | |
| 6,336,271 B1 * | 1/2002 | Rider et al. | 30/279.6 |
| 6,619,194 B1 * | 9/2003 | Kuan | 30/279.6 |
| 6,671,964 B2 * | 1/2004 | Ruiz | 30/123.6 |
| D486,703 S * | 2/2004 | Settele | D7/695 |
| 6,874,236 B2 * | 4/2005 | Levien et al. | 30/279.6 |
| D509,712 S * | 9/2005 | Lee | D7/695 |
| 7,087,067 B2 * | 8/2006 | Kehr et al. | 30/136.5 |
| D573,854 S * | 7/2008 | Dunne et al. | D7/693 |
| D576,847 S * | 9/2008 | Pan | D7/695 |
| D586,190 S * | 2/2009 | Hauser | D7/695 |
| 7,631,429 B2 * | 12/2009 | Chapman et al. | 30/279.6 |
| D609,062 S * | 2/2010 | Kestenbaum | D7/695 |
| D611,780 S * | 3/2010 | Laib | D7/695 |
| D626,387 S * | 11/2010 | Hawker | D7/693 |
| D630,913 S * | 1/2011 | Mishan et al. | D7/693 |
| D645,697 S * | 9/2011 | Hawker et al. | D7/695 |
| D669,325 S * | 10/2012 | Evans | D7/695 |
| D674,253 S * | 1/2013 | Spiegel | D7/695 |
| D674,254 S * | 1/2013 | Spiegel | D7/695 |
| D675,890 S * | 2/2013 | Reay | D7/695 |
| D675,891 S * | 2/2013 | Reay | D7/695 |
| D679,964 S * | 4/2013 | Deconzo | D7/695 |
| D683,200 S * | 5/2013 | Joseph | D7/695 |
| D684,021 S * | 6/2013 | Lion et al. | D7/695 |
| 8,584,581 B2 * | 11/2013 | Curtin | 30/123.5 |
| 8,726,525 B2 * | 5/2014 | Bagley et al. | 30/279.2 |
| D708,493 S * | 7/2014 | Ebrahim et al. | D7/695 |
| 2004/0003728 A1 * | 1/2004 | Levien et al. | 99/584 |
| 2010/0146799 A1 * | 6/2010 | Hoffman et al. | 30/286 |
| 2010/0162906 A1 | 7/2010 | Scimone | |
| 2012/0085249 A1 * | 4/2012 | Kuan | 30/123.5 |
| 2013/0305935 A1 * | 11/2013 | Ebrahim et al. | 30/123.5 |

* cited by examiner

DOUBLE SIDED PEELER

BACKGROUND OF THE INVENTION

1. Field of the Invention

This invention relates generally to food processing devices, and more specifically to a double sided peeler.

2. Description of Related Art

Processing and preparation of food takes many forms, with tools to assist with the preparation and processing of food ranging from simplistic to complex. Peelers have been to used for many years in various forms to remove the skin of fruits and vegetables. Many peelers have a single blade with a narrow opening that not only easily clogs, but is not suited for a variety of fruits and vegetables that may have a wide range of skin characteristics. The ability to provide the user with a choice of blades to take on a variety of peeling jobs would greatly improve this aspect of food processing. In addition, a cover to protect the user from the unused blade where this cover may also become part of the handle would be useful.

In addition, while peeling a fruit or vegetable, it is fairly common to encounter a spot such as a mark left by an insect, an abrasion, a bruise, or the like. This spot is undesirable, and is commonly removed during peeling. This typically involves setting the peeler down, retrieving a knife or other suitable device, removing the spot, and then resuming the process of peeling. What is needed is a peeler that has a spot removal tool incorporated therein. This would make the process of peeling and removing spots quicker and more efficient.

While peelers in their basic form are known in the art, a peeler with the attributes described herein has not heretofore been and represents an unmet need that has been fulfilled by the present invention and the various embodiments described and envisioned herein.

BRIEF SUMMARY OF THE INVENTION

In accordance with the present invention, there is provided a double sided peeler comprising a body having a first rail, a second rail, and a spot tool and retainer; a slide cover comprising a first rail guide and a second rail guide where the first rail guide cooperatively slides along the first rail of the body and the second rail guide cooperatively slides along the second rail of the body; a slide cover retention web integral with the slide cover and capable of retaining the slide cover through interaction with the spot tool and retainer; a first peeler to blade hingably connected to the body; and a second peeler blade hingably connected to the body; whereas the slide cover protects the user from a peeler blade that is not in use.

The foregoing paragraph has been provided by way of introduction, and is not intended to limit the scope of the invention as described in this specification, claims and the attached drawings.

BRIEF DESCRIPTION OF THE DRAWINGS

The invention will be described by reference to the following drawings, in which like numerals refer to like elements, and in which.

The attached figures depict various views of the double sided peeler in sufficient detail to allow one skilled in the art to make and use the present invention. These figures are exemplary, and depict a preferred embodiment; however, it will be understood that there is no intent to limit the invention to the embodiment depicted herein. On the contrary, the intent is to cover all alternatives, modifications, and equivalents as may be included within the spirit and scope of the invention as defined by this specification, claims and drawings.

DESCRIPTION OF THE PREFERRED EMBODIMENTS

A double sided peeler is described and depicted by way of this specification and the attached drawings.

For a general understanding of the present invention, reference is made to the drawings. In the drawings, like reference numerals have been used throughout to designate identical elements.

Figure 1:
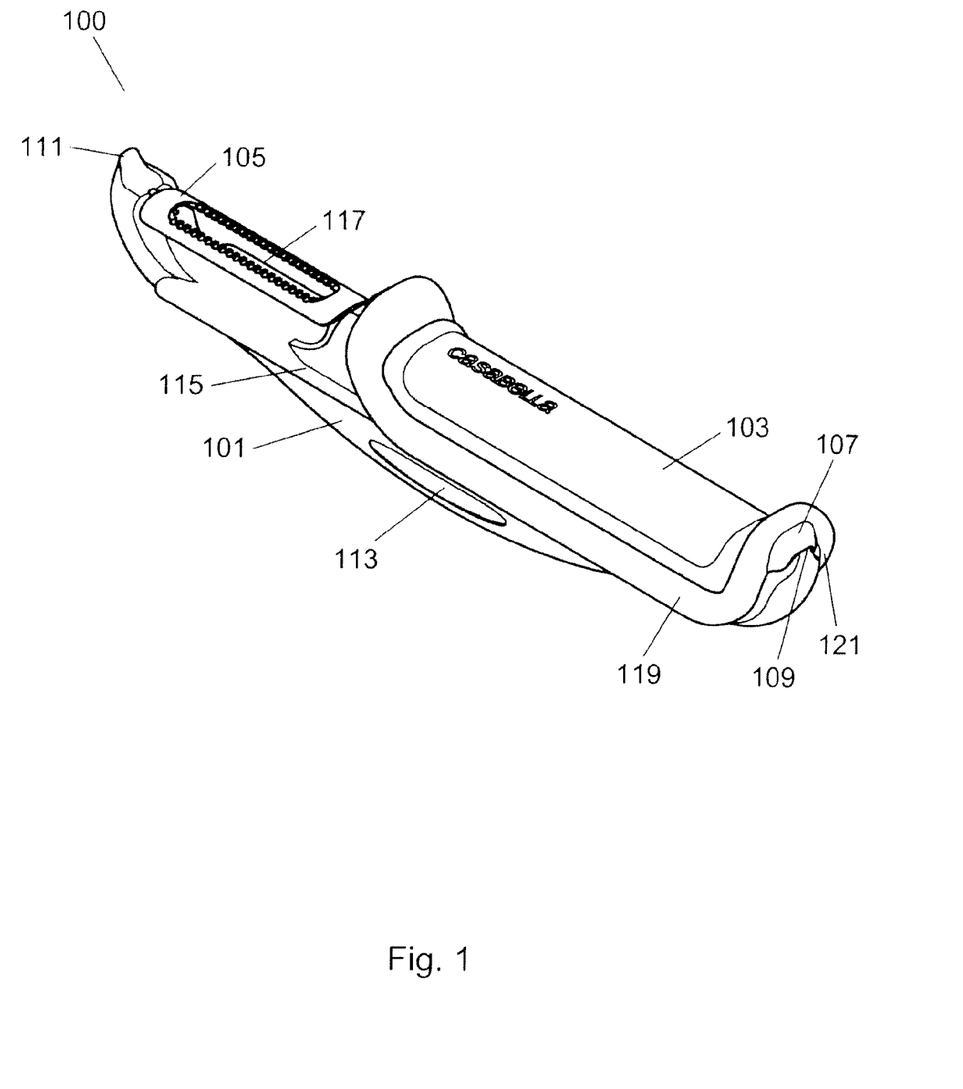
FIG. 1 is a perspective view of the double sided peeler.

Referring to FIG. 1, a perspective view of the double sided peeler 100 is depicted. The body 101 may be made from a plastic such as, for example, Acrylonitrile Butadiene in Styrene (ABS) plastic. The body 101 may also be made from a metal such as, for example, a stainless steel. The body 101 may be made by injection molding, machining, casting, or the like. In some embodiments of the present invention, the body 101 may be made in several parts and assembled together using adhesives, welding, bonding, or the like. The shape of the double sided peeler 100 is such as to accommodate two peeler blades. In addition, the double sided peeler 100 may in some embodiments have a spot tool and retainer. In the embodiment depicted, a first spot tool and retainer 109 and a second spot tool and retainer 111 are depicted. Each spot tool and retainer can be used to remove a spot such as an insect mark, an abrasion, a bruise, or other undesirable marks on a fruit or vegetable. The spot tool and retainer has a generally thin functional end to facilitate easy removal of a spot. The functional end is also generally narrower than the double sided peeler body 101. Each spot tool and retainer also serves to retain the slide cover 103 in a position that covers one of the peeler blades. As can be seen in FIG. 1, a slide cover 103 that has a first rail guide 119 and a second rail guide 121 is attached to the body 101. The slide cover 103 may, in some embodiments of the present invention, be made from a softer durometer material to provide a comfortable grip and also to facilitate easy removal from the body 101 when cleaning the double sided peeler. An example of a material that can be used to make the slide cover 103 is Ethylene Vinyl Acetate (EVA). The slide cover 103 may be made by injection molding, casting, machining, or the like. The slide cover 103 in one embodiment has two upturned ends to adequately cover one of the two peeler blades and also to provide a surface by which the user can slide the slide cover 103 into position. Also depicted in FIG. 1 is a slide cover retention web 107 that is integral with the slide cover 103. The slide cover retention web 107 engages with the first spot tool and retainer to retain the slide cover 103 in a position that covers the second peeler blade. The opposite end of the double sided peeler 100 has a similar arrangement for covering the first peeler blade 105. In some embodiments of the present invention, the slide cover retention web 107 comprises the same material as the slide cover 103, but is thinner than the slide cover 103 to allow the slide cover retention web 107 to pass over the first spot tool and retainer 109 by deformation of the slide cover retention web 107. In some embodiments of the present invention, the web is within a shape that generally outlines the first spot tool and retainer 109 such as, for example, a generally u-shaped outline. The outline may be built up of additional material to impart a thickness and act as a guiding structure for the slide cover retention arrangement herein described. The slide cover retention web 107 is deformable. The slide cover 103 has a first rail guide 119 and a second rail guide 121 on each side of the slide cover 103. The first rail guide 119 and the second rail guide 121 are channels, grooves, recesses, or similar structures that act to encompass or contain a first rail 115 and a second rail 117 that are connected to, or an integral part of, the body 101. In use, the slide cover 103 is moveable by way of the interaction of the first rail 115 with the first rail guide 119 and the second rail 117 with the second rail guide 121. In some embodiments of the present invention, a grip 113 may be attached to, or an integral part of, the body 101. The grip 113 may take any of a variety of shapes, and helps to prevent the user from dropping the double sided peeler 100 while in use. Also seen in FIG. 1 is a first peeler blade 105. A second peeler blade can be seen in later figures, and is covered by the slide cover 103 in FIG. 1. In some embodiments of the present invention, the first peeler blade 105 is serrated or otherwise sharpened. The first peeler blade 105 may be made from a metal such as a stainless steel, a ceramic, or the like. The first peeler blade 105 may be made by machining, casting, stamping, or the like.

Figure 2:
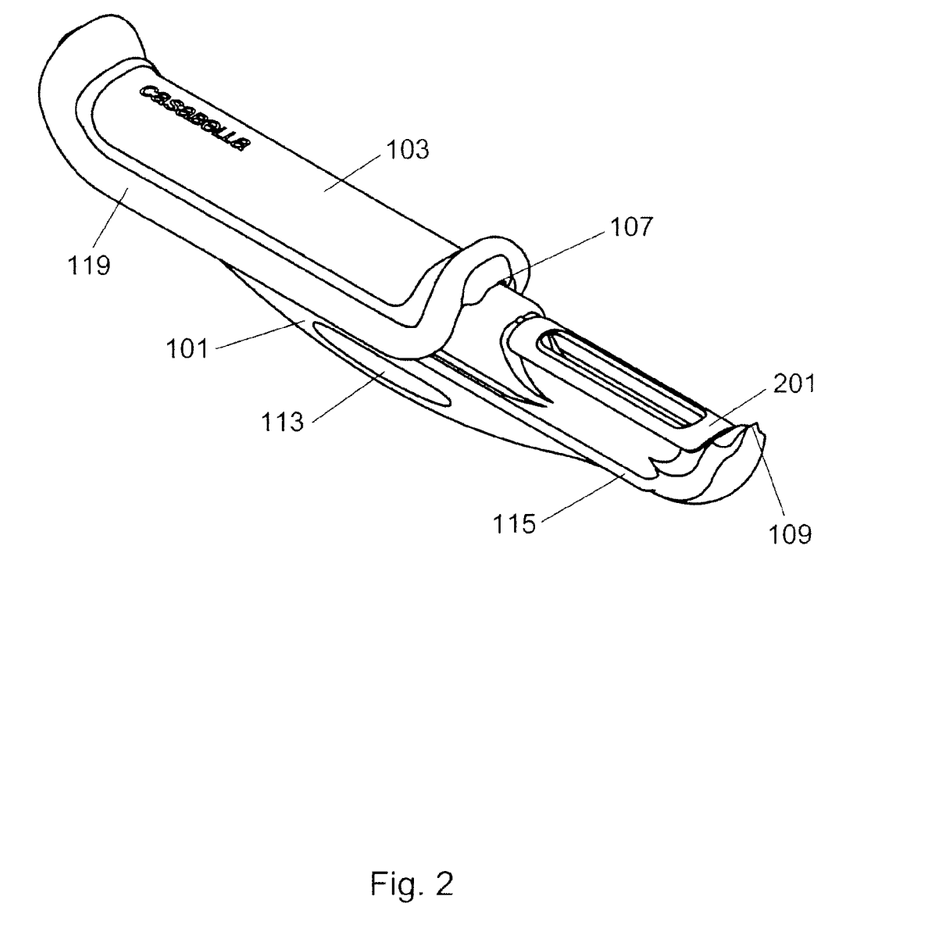
FIG. 2 is a perspective view of the double sided peeler with the second blade exposed.

FIG. 2 is a perspective view of the double sided peeler with the second peeler blade 201 exposed. In some embodiments of the present invention, the second peeler blade 201 is serrated or otherwise sharpened. The second peeler blade 201 may be made from a metal such as a stainless steel, a ceramic, or the like. The second peeler blade 201 may be made by machining, casting, stamping, or the like. One can also see the slide cover 103 moved to cover the first peeler blade 105 with respect to FIG. 1, which shows the second peeler blade 201 covered.

Figure 3:
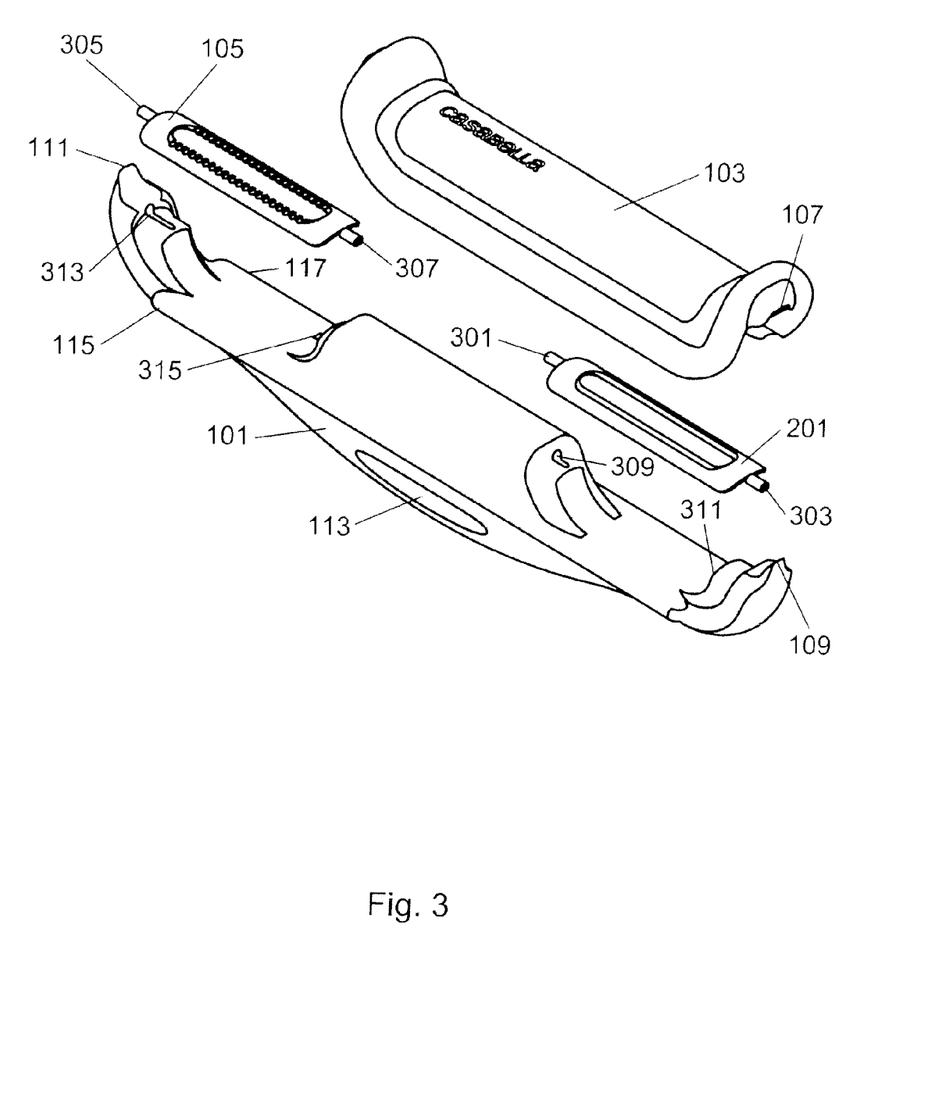
FIG. 3 is an exploded view of the double sided peeler.

FIG. 3 is an exploded view of the double sided peeler that depicts the major component parts and also the interconnection of the peeler blades with the body. Depicted in FIG. 3 by example and not limitation is a hinge arrangement that allows the peeler blade to be fastened to the body 101 while having the ability to rotate along an axis that is generally parallel to the blade. This motion is important while using the double sided peeler to allow the blade to conform to the surface of the fruit or vegetable being peeled. The first peeler blade 105 can be seen in FIG. 3 with a first blade hinge 305 and a second blade hinge 307. The first blade hinge 305 and the second blade hinge 307 may be attached to the first peeler blade 105 by welding, crimping, or other mechanical fastening techniques. Preferably, however, the first blade hinge 305 and the second blade hinge 307 are formed and integral with the first peeler blade 105 by way of shaping and rolling a portion of the first peeler blade 105. A first blade hinge receiver 313 and a second blade hinge receiver 315 can be seen as recessed openings in the body 101. The first blade hinge 305 is placed in the first blade hinge receiver 313 and the second blade hinge 307 is placed in the second blade hinge receiver 315 during assembly of the double sided peeler. In some embodiments of the present invention, the body 101 is manufactured in two pieces and the first peeler bade 105 and the second peeler blade 201 are placed in the appropriate receivers prior to assembly and fastening. In a similar manner, a second peeler blade 201 has a third blade hinge 301 and a fourth blade hinge 303. The third blade hinge 301 and the fourth blade hinge 303 may be attached to the second peeler blade 201 by welding, crimping, or other mechanical fastening techniques. Preferably, however, the third blade hinge 301 and the fourth blade hinge 303 are formed and integral with the second peeler blade 201 by way of shaping and rolling a portion of the second peeler blade 201. A third blade hinge receiver 309 and a fourth blade hinge receiver 311 can be seen as recessed openings in the body 101. The third blade hinge 301 is placed in the third blade hinge receiver 309 and the fourth blade hinge 303 is placed in the fourth blade hinge receiver 311 during assembly of the double sided peeler.

Figure 4:
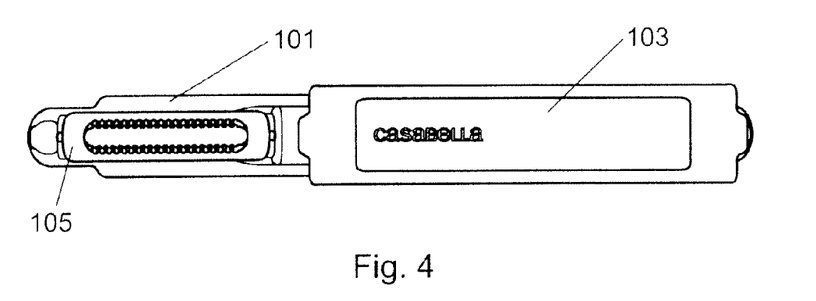
FIG. 4 is a top plan view of the double sided peeler with the first peeler blade exposed.

FIG. 4 is a top plan view of the double sided peeler with the first peeler blade exposed. The slide cover 103 can be seen covering the second peeler blade 201 (not visible in FIG. 4).

Figure 5:
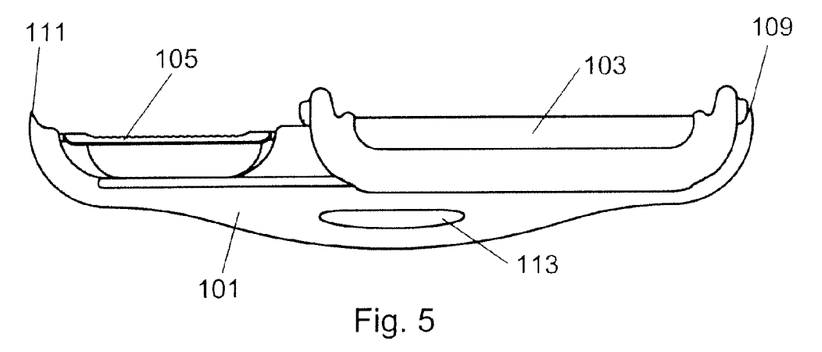
FIG. 5 is a side plan view of the double sided peeler with the first peeler blade exposed.

FIG. 5 is a side plan view of the double sided peeler with the first peeler blade exposed as in FIG. 4.

Figure 6:
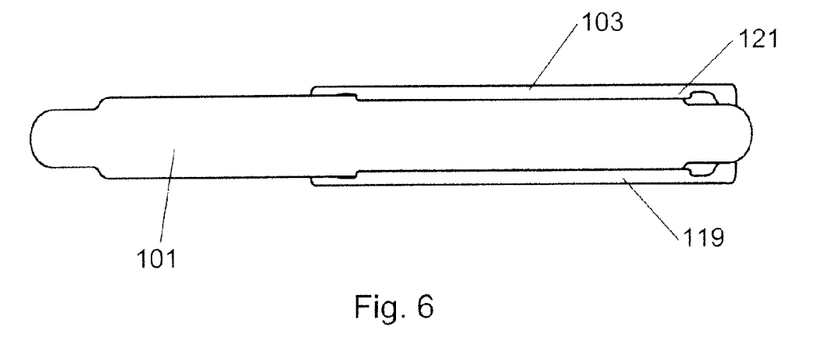
FIG. 6 is a bottom plan view of the double sided peeler.

FIG. 6 is a bottom plan view of the double sided peeler with the first peeler blade exposed as in FIG. 4.

Figures 7, 8:
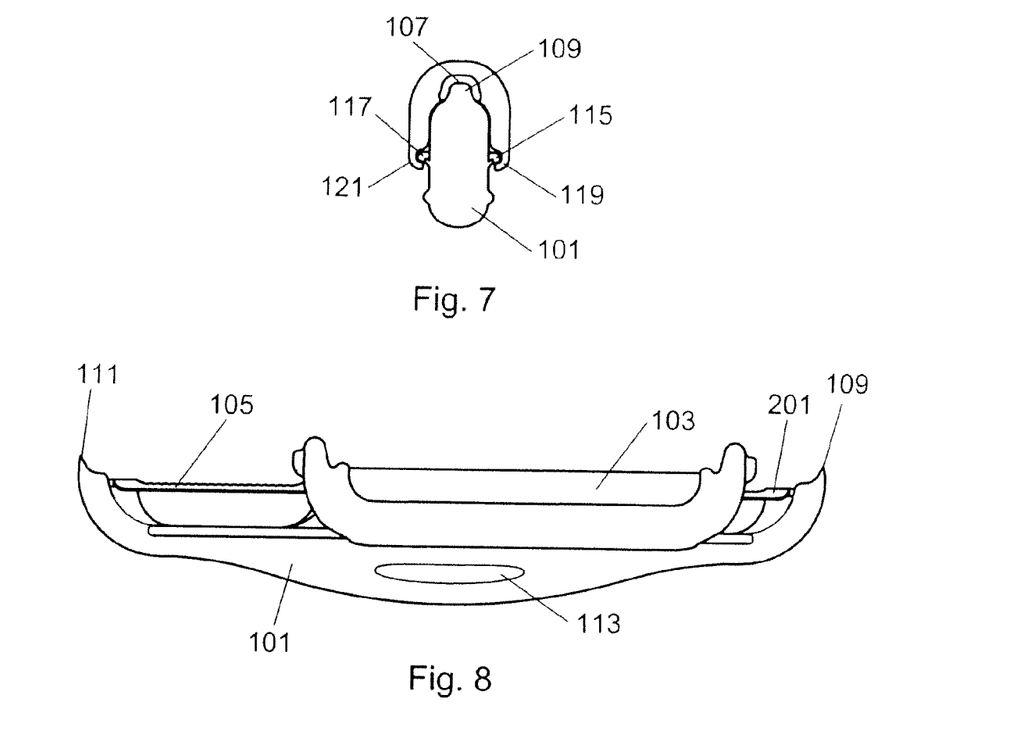
FIG. 7 is an end plan view of the double sided peeler.
FIG. 8 is a side plan view of the double sided peeler with the slide cover partially exposing both blades.

FIG. 7 is an end plan view of the double sided peeler. The cooperation between the first rail 115 and the first rail guide 119 and the second rail 117 and the second rail guide 121 can be clearly seen. In addition, the interaction between the slide cover retention web 107 and the first spot tool and retainer 109 can be seen.

FIG. 8 is a side plan view of the double sided peeler with the slide cover partially exposing both blades. While not used in this position, FIG. 8 provides a view of the slide cover 103 and its interrelationship with the body and the peeler blades.

Figure 9:
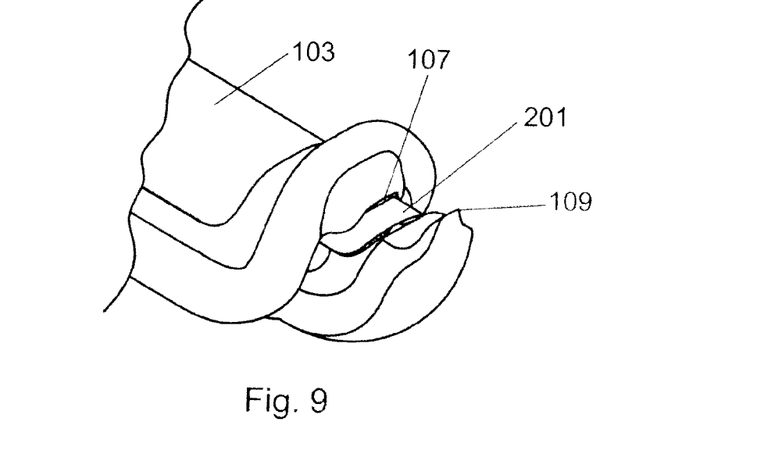
FIG. 9 is a close up perspective view of the slide cover retention arrangement.

FIG. 9 is a close up perspective view of the slide cover retention arrangement. FIG. 9 shows the slide cover retention web 107 in relation to the first spot tool and retainer 109. The slide cover retention web 107 in some embodiments of the present invention comprises the same material as the slide cover 103, but is thinner than the slide cover 103 to allow the slide cover retention web 107 to pass over the first spot tool and retainer 109 by deformation of the slide cover retention web 107. In some embodiments of the present invention, the web is provided within a shape such as the shape that generally outlines the first spot tool and retainer 109, such as a generally u-shaped outline. The outline may be built up of additional material to impart a thickness and act as a guiding structure for the slide cover retention arrangement herein described. The slide cover retention web 107 is deformable such that the first spot tool and retainer 109 passes by the slide cover retention web 107 but deforms to resist return travel of the slide cover 103. In a similar manner, the second spot tool and retainer 111 interacts with a slide cover retention web (not shown in FIG. 9) that is on the opposing end of the slide cover 103.

Figure 10:
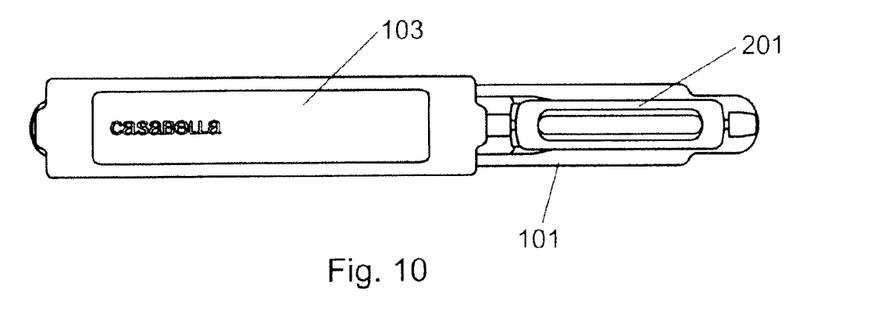
FIG. 10 is a top plan view of the double sided peeler with the second peeler blade exposed.
Figure 11:
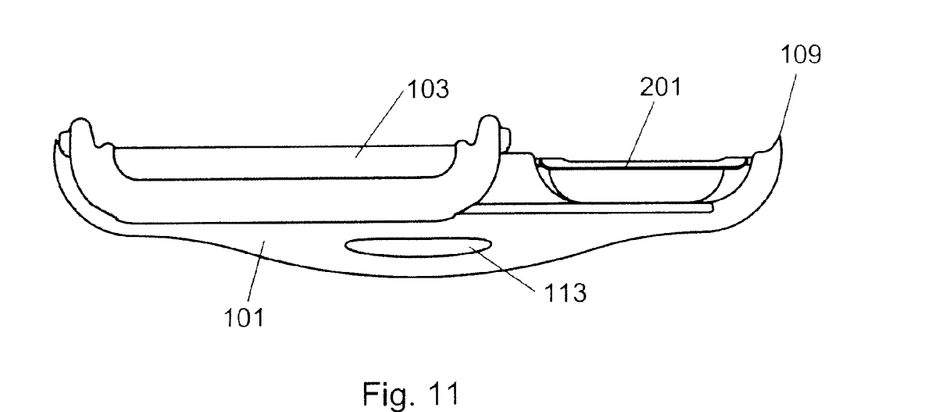
FIG. 11 is a side plan view of the double sided peeler with the second peeler blade to exposed.
Figure 12:
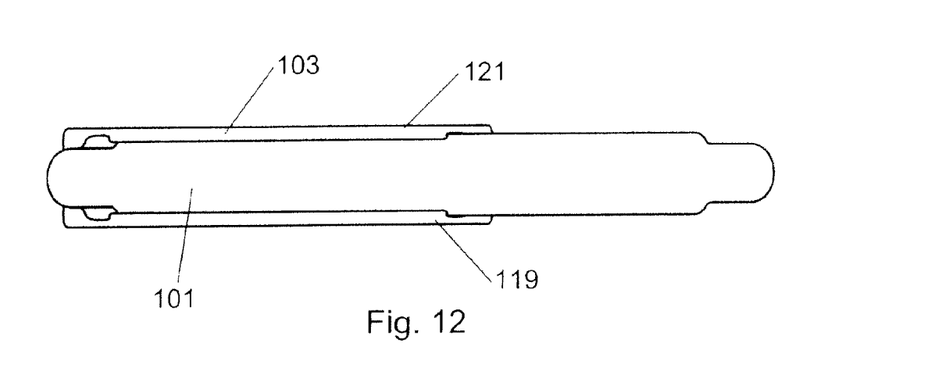
FIG. 12 is a bottom plan view of the double sided peeler with the second peeler blade exposed.

FIG. 10 is a top plan view of the double sided peeler with the second peeler blade exposed. FIG. 11 is a side plan view of the double sided peeler with the second peeler blade exposed. And FIG. 12 is a bottom plan view of the double sided peeler with the second peeler blade exposed.

To use the double sided peeler, one grasps the body 101 with the selected peeler blade exposed and the unselected peeler blade covered by the slide cover 103. The user then makes generally linear motions of the peeler blade across the surface of the fruit or vegetable to be peeled, allowing the skin of the fruit or vegetable to be removed through the cutting action of the peeler blade.

It is, therefore, apparent that there has been provided, in accordance with the various objects of the present invention, a double sided peeler. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and the attached drawings.

What is claimed is:

1. A double sided peeler comprising:
    a body comprising a first rail, a second rail, and a spot tool and retainer;
    a slide cover comprising a first rail guide and a second rail guide where the first rail guide cooperatively slides along the first rail of the body and the second rail guide cooperatively slides along the second rail of the body;
    a deformable slide cover retention web integral with the slide cover and capable of retaining the slide cover through interaction with the spot tool and retainer;
    a first peeler blade hingably connected to the body; and
    a second peeler blade hingably connected to the body.

2. The double sided peeler of claim 1, wherein the body further comprises a second spot tool and retainer.

3. The double sided peeler of claim 2, further comprising a second slide cover retention web integral with the slide cover and capable of retaining the slide cover over one of the peeler blades through interaction with the second spot tool and retainer.

4. The double sided peeler of claim 1, further comprising a grip connected to the body.

5. The double sided peeler of claim 1, wherein the hingable connection between the first peeler blade and the body comprising a first blade hinge and a second blade hinge attached to the first peeler blade, and a first blade hinge receiver and a second blade hinge receive integral with the body.

6. The double sided peeler of claim 1, wherein the hingable connection between the second peeler blade and the body comprises a third blade hinge and a fourth blade hinge attached to the second peeler blade, and a third blade hinge receiver and a fourth blade hinge receiver integral with the body.

7. The double sided peeler of claim 1, wherein the slide cover comprises Ethylene Vinyl Acetate.

8. The double sided peeler of claim 1, within the body comprises Acrylonitrile Butadiene Styrene.

9. The double sided peeler of claim 1, wherein the first peeler blade is serrated.

10. The double sided peeler of claim 1, wherein the second peeler blade is serrated.

11. A double sided peeler comprising:
    a body comprising a first rail and a second rail;
    a slide cover comprising a first rail guide and a second rail guide where the first rail guide cooperatively slides along the first rail of the body and the second rail guide cooperatively slides along the second rail of the body;
    a deformable slide cover retention web integral with the slide cover;
    a first peeler blade having a first blade hinge and a second blade hinge;
    a first blade hinge receiver and a second blade hinge receiver integral with the body and in retention of the first peeler blade;
    a second peeler blade having a third blade hinge and a fourth blade hinge; and
    a third blade hinge receiver and a fourth blade hinge receiver integral with the body and in retention of the second peeler blade.

12. The double sided peeler of claim 11, wherein the body further comprises a spot tool and retainer that is capable of retaining the slide cover through interaction with the retention web.

13. The double sided peeler of claim 11, further comprising a second slide cover retention web integral with the slide cover.

14. The double sided peeler of claim 13, wherein the body further comprises a second spot tool and retainer that is capable of retaining the slide cover through interaction with the second retention web.

15. The double sided peeler of claim 11, further comprising a grip connected to the body.

16. The double sided peeler of claim 11, wherein the slide cover comprises Ethylene Vinyl Acetate.

17. The double sided peeler of claim 11, wherein the body comprises Acrylonitrile Butadiene Styrene.

18. The double sided peeler of claim 11, wherein the first peeler blade is serrated.

19. The double sided peeler of claim 11, wherein the second peeler blade is serrated.

* * * * *